United States Patent [19]
Kendrick, Jr.

[11] Patent Number: 5,587,554
[45] Date of Patent: Dec. 24, 1996

[54] CABLE DIRECTING DEVICE

[76] Inventor: Ralph C. Kendrick, Jr., 553 Warren Ave., Chesapeake, Va. 23320

[21] Appl. No.: 20,568

[22] Filed: Feb. 22, 1993

[51] Int. Cl.⁶ ................................................. H02G 9/00
[52] U.S. Cl. ........................... 174/37; 174/48; 174/38; 52/220.1; 254/134.3 R
[58] Field of Search .................................. 174/1, 37, 38, 174/39, 48, 49, 68.1, 68.2, 68.3, 81; 52/36.5, 220.1, 220.3, 220.8; 138/155, DIG. 4, DIG. 8, DIG. 11; 254/134.3 R

[56] References Cited

U.S. PATENT DOCUMENTS

| | | | |
|---|---|---|---|
| 1,014,704 | 1/1912 | Havens, Jr. | 174/81 |
| 1,986,121 | 1/1935 | Sargent | 52/220.1 X |
| 4,145,857 | 3/1979 | Tilsen | 174/38 X |
| 4,165,592 | 8/1979 | Blankenship | 174/38 X |
| 4,213,111 | 7/1980 | Lux, Jr. | 174/38 X |

FOREIGN PATENT DOCUMENTS

| | | | |
|---|---|---|---|
| 3800856 | 7/1989 | Germany | 52/220.1 |

*Primary Examiner*—H. S. Sough
*Attorney, Agent, or Firm*—Shefte, Pinckney & Sawyer

[57] ABSTRACT

A device for directing underground electrical cables between an above ground electrical apparatus disposed on a supporting pad and an underground conduit includes a hollow housing defining first and second openings and a passageway extending interiorly through the housing between the openings, the first opening being substantially larger than the second opening and matable with the access opening of the supporting pad, and the second opening being matable with the underground conduit for directing cables between the underground conduit and the access opening in the support pad for connection to the electrical apparatus.

11 Claims, 5 Drawing Sheets

CABLE DIRECTING DEVICE

BACKGROUND OF THE INVENTION

The present invention relates generally to devices for directing cables and, more particularly, to a device for directing underground electrical cables between an underground shielded conduit and an above-ground electrical apparatus, such as a switch or transformer.

Virtually all electric power is transmitted from substations to individual users at relatively high voltages, on the order of 5000 to 1500 volts, and tie switches are used to obtain single phase, low current power for distribution as the familiar 110 or 220 volts for household use from three-phase, high current transmission power. Most residential service takes the form of single phase dual voltage AC obtained from the switch. Due to substantially increased demands for electrical power over the recent past in combination with an increased awareness of natural aesthetics, electrical cables are increasingly being buried underground rather than suspended overhead between supporting poles. This has caused the relocation of many switches and power transformers from their pole-mounted positions to ground-supported installations. Underground cables are typically housed in protective conduits which are buried from three to six feet underground. Currently, with underground electrical transmission lines, switches are disposed on concrete pads and the cables are routed upwardly from beneath the surface into the switch for power transmission into and out of the switch.

To install switches associated with underground electrical cables, ground-level supporting pads, which may be formed of concrete, are provided to support the switch slightly above the surrounding earth. The pads themselves are formed with an appropriate number of openings through which the cables may be routed for connection to the switch disposed on the pad.

A common problem with the installation of switches is the difficulty of routing the generally horizontally extending underground cables through a 90° turn to extend generally vertically into the opening for connection to the switch. Current practice utilizes a series of L-shaped conduits which are installed in a row with their upper openings projecting through the opening formed in the concrete pad. The L-shaped conduits are aligned with a template and an individual cable is routed through each conduit. This installation is very time consuming and when the template is removed, the L-shaped conduits tend to shift out of proper alignment resulting in a poor installation.

While the above discussion focuses on electrical switches and underground electrical cables, the principles involved are applicable with installations of other underground cables which are connected to above ground apparatus, such as transformers, buried telephone cable and switching units and buried cable television cable.

SUMMARY OF THE INVENTION

It is accordingly an object of the present invention to provide a device for directing cable from underground conduits upwardly to above-ground switches, transformers, or other electrical apparatus. More specifically, it is an object of the present invention to provide a cable directing device for enclosing and directing underground electrical cable between an underground shielding conduit for the cables and an above-ground electrical apparatus, which will substantially simplify and shorten the time required for installation of the cables. The electrical apparatus is of the type disposed on a ground level supporting pad having formed therein an access opening substantially enlarged in relation to the underground conduit. The access opening allows passage of the cables therethrough for subsequent connection to the electrical apparatus.

According to the present invention, a cable directing device comprises a hollow housing defining first and second cable passage openings and a cable directing passageway extending interiorly through the housing between the first and second openings. The first cable passage opening is formed to be substantially larger than the second cable passage opening. The first cable passage opening is configured to substantially conform to and be matable with the access opening in the support pad, while the second cable passage opening is configured to substantially conform to and be matable with the underground shielding conduit. Further, the first and second cable passage openings are oriented substantially perpendicularly to one another and the cable directing passageway is curved substantially 90° between the first and second cable passage openings. The cable directing passageway is tapered narrowingly from the first cable passage opening toward the second passage opening, whereby the cable directing device may be positioned to project downwardly from the access opening in the supporting pad for directing a plurality of underground cables between the access opening in the supporting pad and the underground conduit.

Preferably, the housing includes a front wall portion having the second cable passage opening formed therein and a curved rear wall portion for directing cables between the first and second cable passage openings. Side wall portions disposed intermediate the front wall and the rear wall complete the housing structure.

Additionally, the cable directing device may include an arrangement for mounting the device to the supporting pad. Preferably, the mounting arrangement comprises a flange attached to the housing at the first cable passage opening and projecting outwardly therefrom for engagement with the supporting pad with the housing projecting through the opening in the supporting pad to be suspended therebeneath.

It is further preferred that the housing include an arrangement for mating the device with an underground cable shielding conduit. The conduit mating arrangement includes a generally tubular member projecting outwardly from the housing and encircling the second opening. The tubular member is configured to mate with the underground cable shielding conduit.

According to another preferred embodiment of the present invention, a third cable passage opening is disposed in a side-by-side relationship with the second cable passage opening. The third cable passage opening is of similar size and configuration as the second cable passage opening including being configured to mate with an underground shielding conduit.

DESCRIPTION OF THE PREFERRED EMBODIMENT

Figure 1:
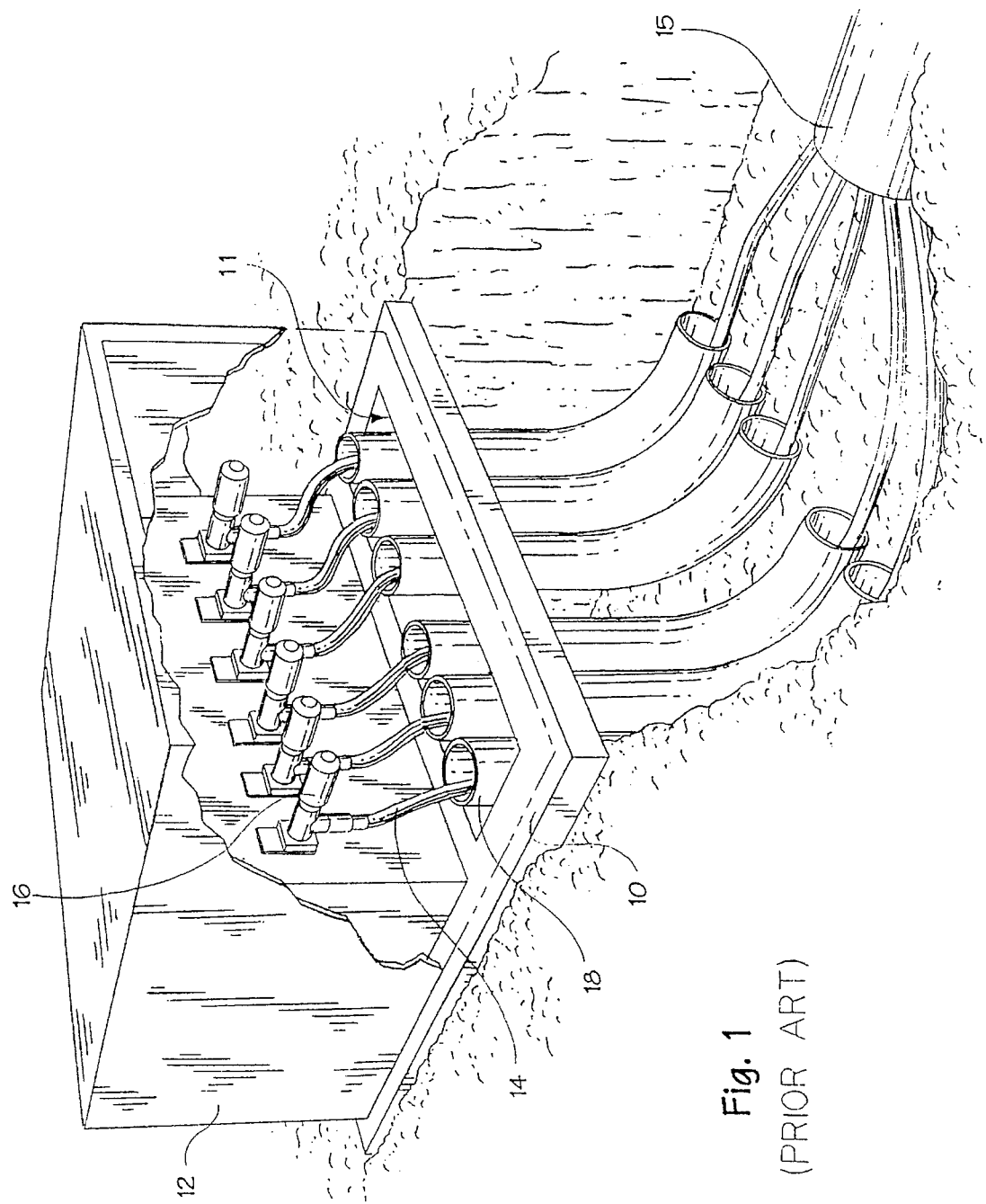
FIG. 1 is a perspective view of a prior art switch installation using generally L-shaped conduits for directing cables, showing the switch housing partially broken away.

Turning now to the drawings and more particularly to FIG. 1, a typical prior switch installation is illustrated. A distribution switch 12 is shown broken away and disposed on a preformed concrete supporting pad 10, which is positioned above a hole excavated for cable routing. An access opening 11 is formed in the supporting pad 10 providing cable access to the switch 12. An underground conduit 15 containing incoming and outgoing electrical cables 14 is positioned to terminate underneath the supporting pad 10.

The conventional prior art method of directing cables from the underground conduit 15 to the switch 12 involves placing a series of generally L-shaped conduits 18 to extend between the access opening 11 and the underground conduit 15. As seen in FIG. 1, six L-shaped conduits 18 are required for installation of a three-phase in/single phase out switch 12. In order to insure proper alignment of the L-shaped conduits 18, a template (not shown) is used. The template is not part of the installation and upon its removal, the L-shaped conduits 18 tend to shift out of alignment which can adversely affect cable 14 positioning. Further, the L-shaped conduits 18 do not converge into a single unified opening so that the cables 14 which exit the underground conduit 15 must be individually routed to each L-shaped conduit 18. The cables remain exposed in the area intermediate the end of the conduit 15 and the entrance to the L-shaped conduits 18.

The prior installation illustrated in FIG. 1 involves approximately two people expending four hours of labor each and typically results in a less than ideal installation. Installation according to the present invention is illustrated in FIG. 2, which will be explained in greater detail hereinafter.

Figure 3:
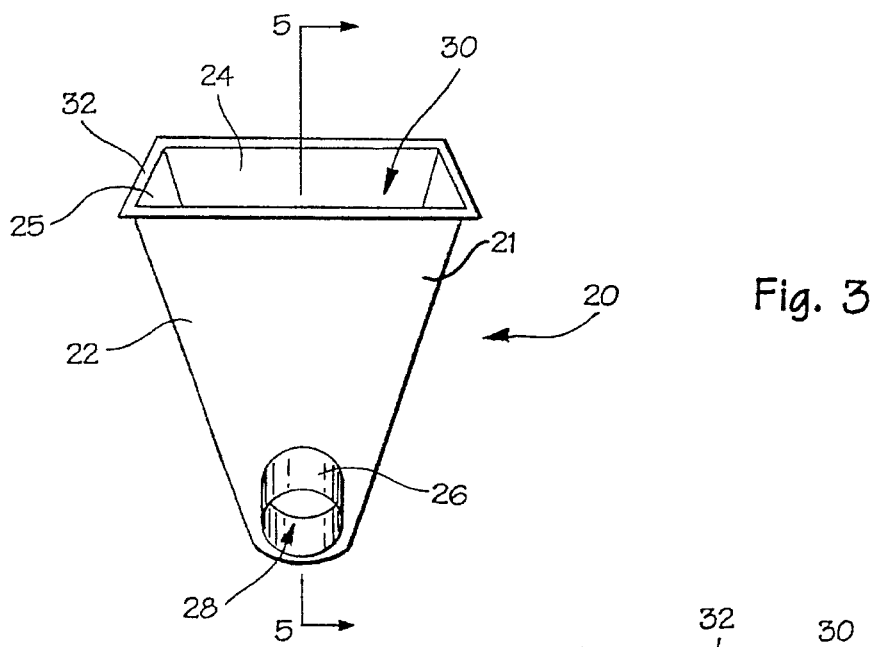
FIG. 3 is a front perspective view of a cable directing device according to the preferred embodiment of the present invention.
Figure 4:
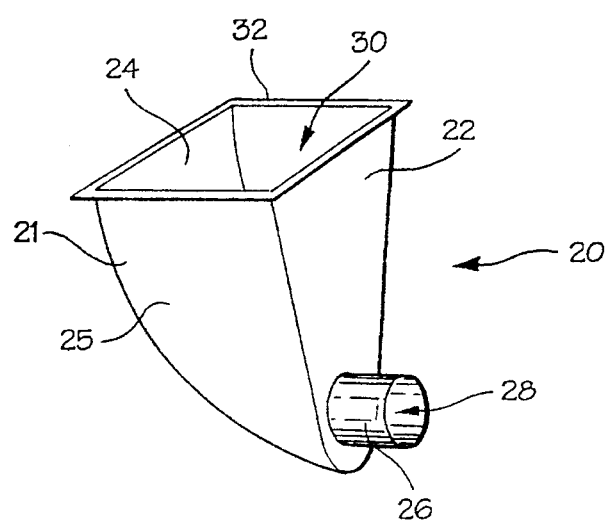
FIG. 4 is a side perspective view of the cable directing device illustrated in FIG. 3.

Turning now to FIGS. 3 and 4, a cable directing device according to the present invention is illustrated in its entirety at 20 and includes a hollow housing 21 defining a generally vertically facing rectangular upper opening 30 and a substantially smaller, generally horizontally facing circular lower opening 28. According to one preferred embodiment, the housing 21 is basically comprised of an essentially flat front wall 22, a curved rear wall 24, and two curved side walls 25, disposed intermediate the rear wall 24 and the front wall 22. All walls 22,24,25 are formed with a relatively thin cross-section.

Figure 2:
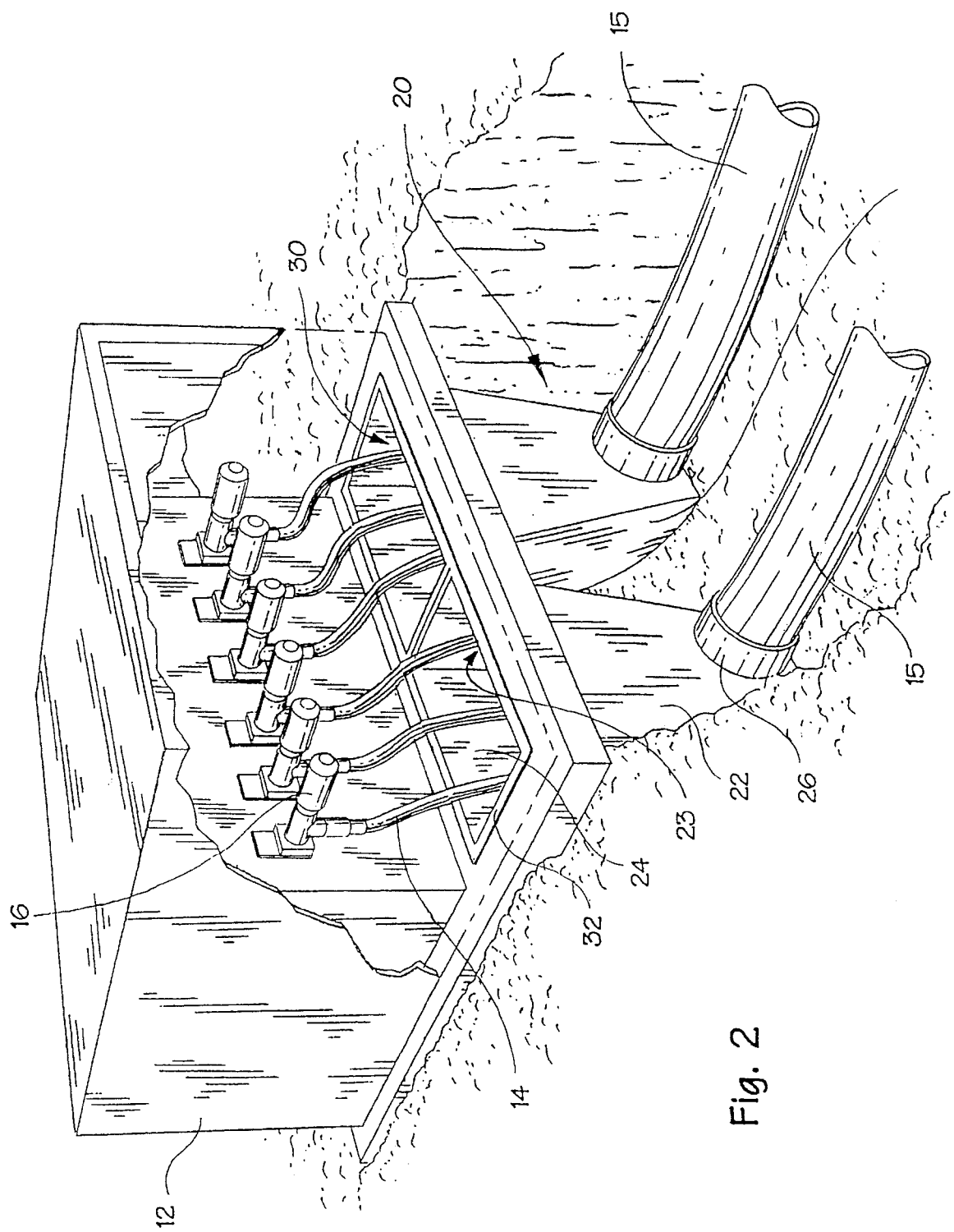
FIG. 2 is a similar perspective view of a switch installation illustrating the preferred embodiment of the present invention, showing the switch housing partially broken away.

The entire upper portion of the housing 21 is opened to define the rectangular upper opening 30 which is configured to mate with the access opening 11 formed in the supporting pad 10, as seen in FIG. 2, and as will be explained in greater detail hereinafter. The front wall 22 is a generally truncated V-shaped flat member extending downwardly from the upper opening 30. The rear wall 24 extends downwardly from the upper opening 30 in a generally curved manner through 90° to its terminus against the front wall 22 at the underside of the device 20.

Figure 5:
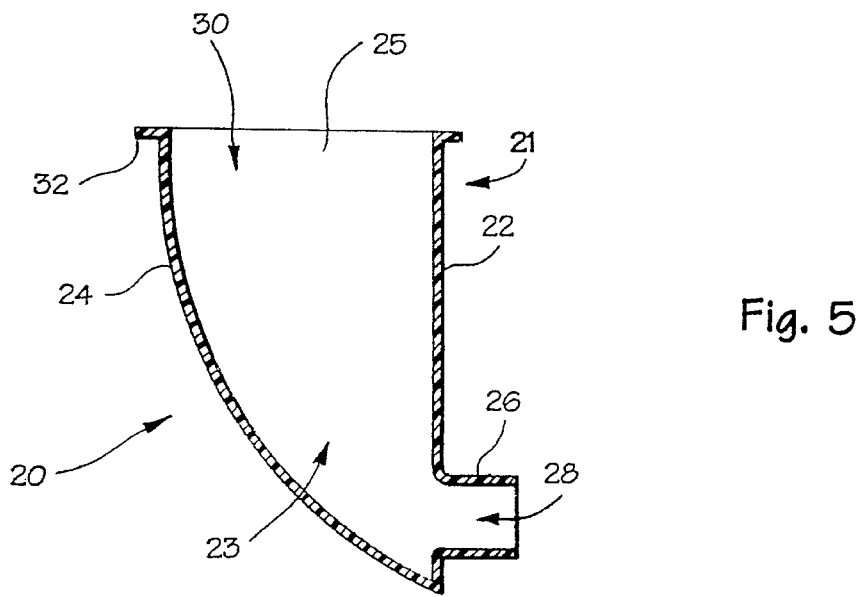
FIG. 5 is a cross-sectional view of the cable directing device taken along line 5—5 of FIG. 3.

The side walls 25 are essentially flat members which extend downwardly from the upper opening 30 and are curved along their rearwardmost extent to conform to the curvature of the rear wall 24. As best seen in FIG. 5, the housing 21 thusly defines a passageway 23 which extends between the upper opening 30 and the lower opening 28 for accommodation of the cables 14. The housing 21 is preferably integrally formed, for example of polyvinylchloride (PVC), polyethylene, or other moldable rigid plastic. Of course, while it is preferable to form the housing of plastic, fiberglass or other suitable material will suffice.

The lower opening 28 is formed in the front wall 22 adjacent the lowermost extent thereof. A generally tubular mating member 26 projects outwardly from the front wall 22 of the housing 21, encircling the area immediately surrounding the lower opening 28 and projecting perpendicularly outwardly from the front wall 22. The tubular member 26 is configured to mate with the underground conduit 15 thereby providing a continuous shielded cable transit from the underground cable conduit to the above-ground switch 12, as will be explained in greater detail hereinafter.

A flange 32 is formed on the housing 21 to extend around the perimeter of the upper opening 30 and to project outwardly a short distance therefrom. As will be seen, the flange 32 engages the supporting pad 10 to retain and align the housing 21 in an operational disposition projecting downwardly below the support pad 10.

Figure 6:
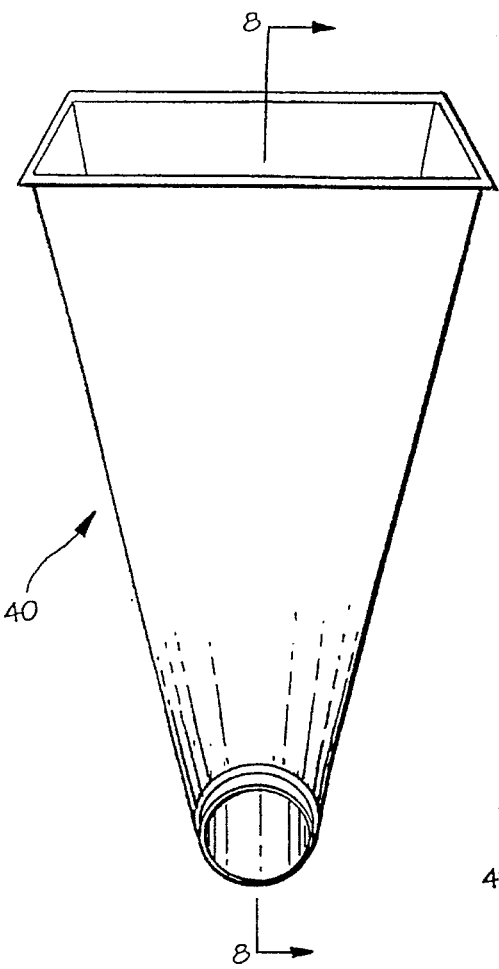
FIG. 6 is a front perspective view of a cable directing device according to a second preferred embodiment of the present invention.
Figure 7:
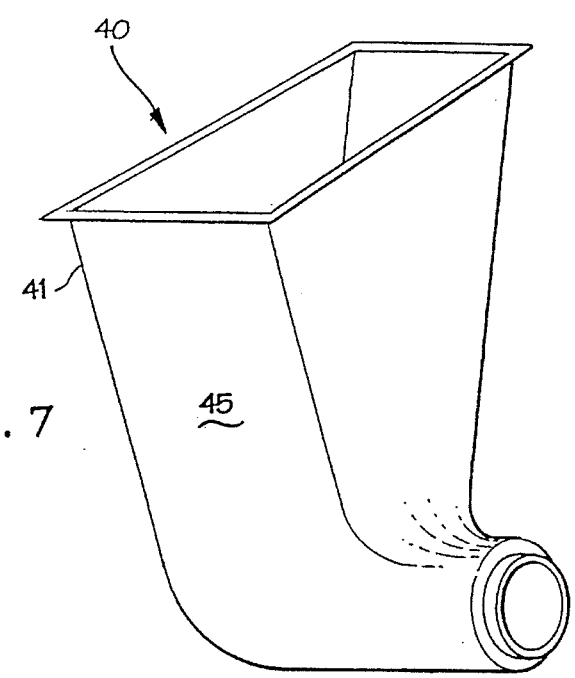
FIG. 7 is a side perspective view of the cable directing device illustrated in FIG. 6.
Figure 8:
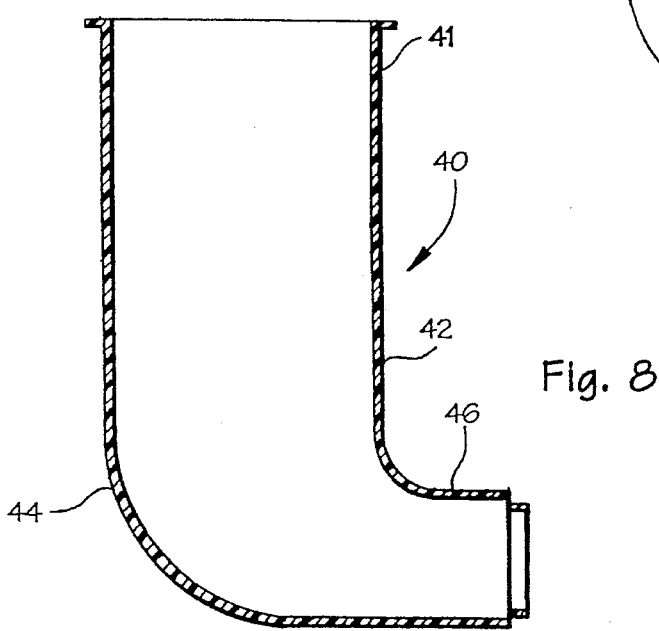
FIG. 8 is a cross-sectional view of the cable directing device taken along lines 8—8 of FIG. 6.

Turning to FIGS. 6 and 7, a cable directing device according to a second preferred embodiment of the present invention is illustrated in its entirety at 40 and is configured similarly to the embodiment illustrated in FIGS. 3 and 4. However, this embodiment includes a curved front wall 42 which projects forwardly in cooperation with a curved rear wall 44 and two curved side walls 45 to form an integral mating member 46 which projects outwardly from the housing 41. This second preferred embodiment is similar to the first preferred embodiment in function and operation and may be utilized with relatively more flexible cables allowing a sharper bend or in situations requiring a stronger union between the mating member 46 and the housing 41.

Figure 9:
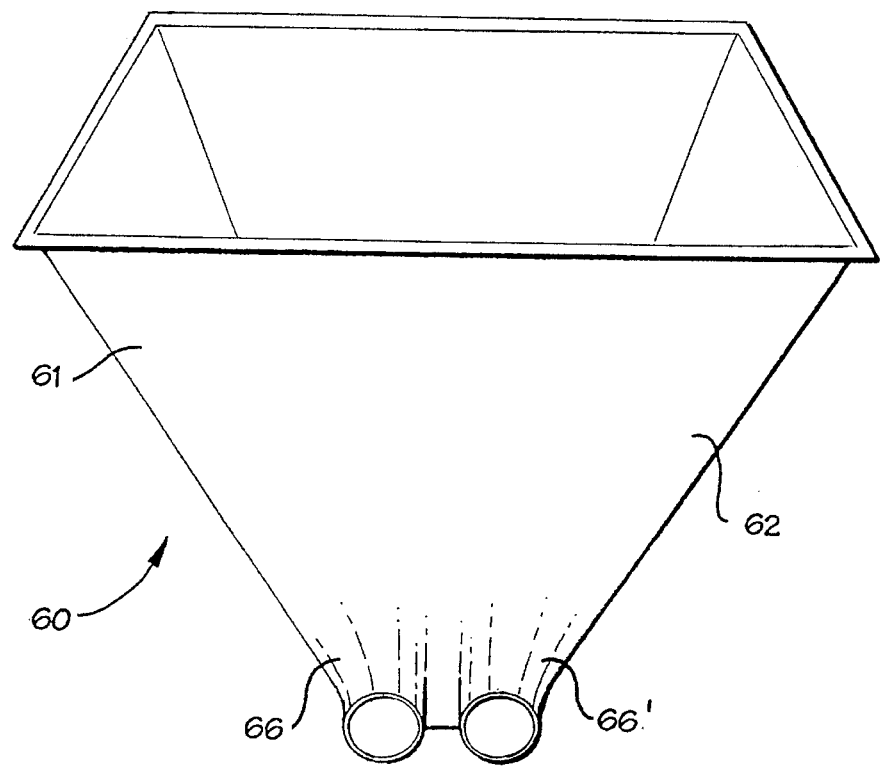
FIG. 9 is a front perspective view of a cable directing according to a third preferred embodiment of the present invention.
Figure 10:
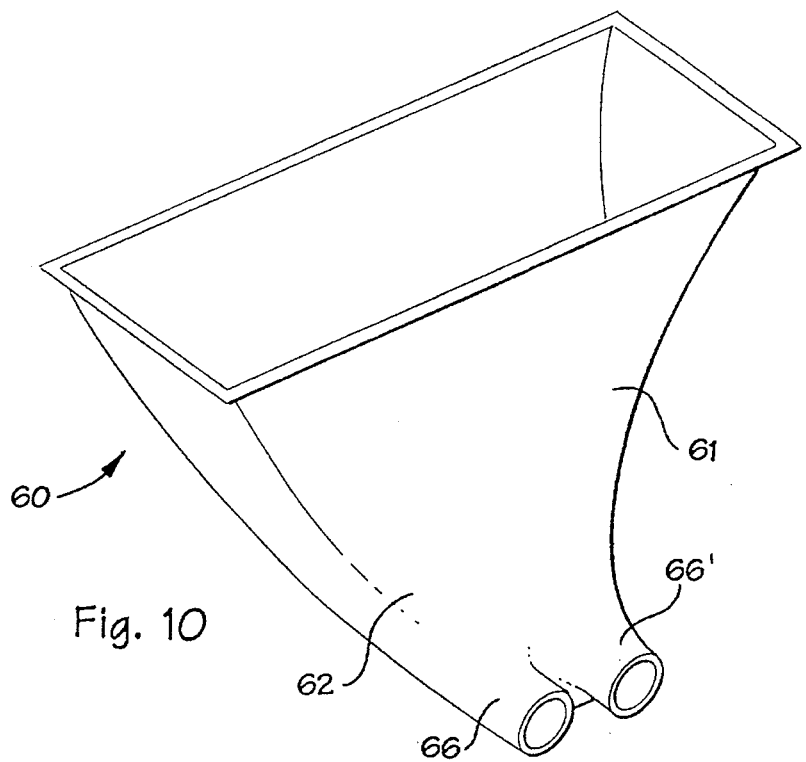
FIG. 10 is a side perspective view of the cable directing device illustrated in FIG. 9.

A third preferred embodiment of the present invention is illustrated in FIGS. 9 and 10. In transformer installations, typically a single opening will be formed in the support pad in contrast with the switch installation of FIG. 2 which shows two devices utilized with two discrete pad openings. Therefore, the transformer situation requires a single cable directing device having two openings. With reference to FIG. 9, the third preferred embodiment of the present invention illustrates a cable directing device for use with transformers and is illustrated generally at 60 and includes a housing 61 configured similarly to the device illustrated in FIGS. 3 and 4 however on a larger scale. Since this embodiment is designed to take the place of two of the devices illustrated in FIGS. 3 and 4, two mating members 66 and 66' are mounting to a front wall 62 in a side-by-side relationship. Installation and operation of the third preferred embodiment of the present invention is similar to that of the other two embodiments as will be described in greater detail presently.

Turning now to FIG. 2, the first preferred embodiment of the present invention is illustrated as installed in an operational state, with two directing devices 20 according to the present invention installed on a single support pad 10. Installation of a switch 12 on a support pad 10 utilizing the present invention proceeds conventionally from excavating the hole above which the switch 12 will be disposed to installing the support pad 10 with the access opening 11 formed therein over the excavated ground. Since the cable directing device 20 of the present invention is tapered from its widest extent at the upper opening 30 to its narrowest extent adjacent the lower opening 28, the device 20 may be installed from above the support pad by inserting the housing 21 through the access opening 11 with the lower opening 28 facing the underground conduit 15. The device 20 is lowered into place with the flange 32 in surface abutment with the upper surface of the support pad 10 surrounding the access opening 11. Cables to be routed to the switch are inserted through the lower opening 28 and the curved rear wall 24 guides the cables 14 from their generally horizontal orientation through the passageway 23 to the generally vertical orientation required for connection to the switch 12. Further, if the circumstances require, cables may be routed downwardly through the upper opening 30 and, directed by the passageway 23, outwardly through the lower opening 28. The underground shielding conduit 15 is then fitted within the tubular member 26 projecting outwardly from the front wall 22 of the housing 21. The switch 12 is then placed on the support pad 10 and the cables 15 joined to their respective connecting terminals 16. The excavation is then refilled and the switch is ready for operation.

By the present invention, a simple and effective cable directing device is provided which greatly reduces the time necessary to install an above-ground transformer using underground cables. In substantial contrast to the prior art, the present invention requires no template for aligning individual L-shaped conduits, provides simple and easy cable routing, and provides complete cable shielding from the underground conduit 15 into and out of the switch 12.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A cable directing device for enclosing and directing underground electrical cable between an underground shielding conduit for the cables and an above-ground electrical apparatus of the type disposed on a preformed supporting pad having formed therein an access opening substantially enlarged in relation to the underground conduit for passage of the cables through access opening, said directing device comprising a hollow housing defining first and second cable passage openings and a cable directing passageway extending interiorly through the housing between said first and second cable passage openings, said first cable passage opening being directed upwardly and being substantially larger than said second cable passage opening, said first cable passage opening being configured to substantially conform to and be matable with the access opening in the supporting pad and said second cable passage opening being directed generally horizontally and configured to substantially conform to and be matable with the underground shielding conduit, including a mating member projecting outwardly from said housing and configured to mate with an underground shielding conduit, said first and second cable passage openings being oriented substantially perpendicularly to one another and said cable directing passageway being curved substantially ninety degrees (90°) between said first and second cable passage openings and being tapered narrowingly from said first cable passage opening toward said second cable passage opening, said cable directing device including means for mounting said device to the supporting pad whereby said cable directing device may be positioned to project downwardly from the access opening in the supporting pad for directing a plurality of underground cables between the access opening in the supporting pad and the underground conduit.

2. A cable directing device according to claim 1 wherein said housing includes a front wall portion having said second cable passage opening formed therein and a curved rear wall portion for directing cables between said first and second cable passage openings.

3. A cable directing device according to claim 2 wherein said front wall portion includes a bracing wall portion disposed adjacent and below said second cable passage opening for ground abutment to brace said device against movement after installation.

4. A cable directing device according to claim 3 wherein said mounting means includes a flange attached to said housing at said first cable passage opening and projecting outwardly therefrom for engagement with the supporting pad with said housing projecting through the opening in the supporting pad to be suspended therebeneath.

5. A cable directing device according to claim 4 and further comprising a third cable passage opening disposed in a side-by-side relationship with said second cable passage opening, said third cable passage opening being of similar size and configuration as said second cable passage opening.

6. A cable directing device according to claim 5 wherein said mating member includes two generally tubular members projecting outwardly from said housing and encircling each said opening, said tubular members being configured to mate with an underground cable shielding conduit.

7. A cable directing device according to claim 6 wherein said mating member includes a generally tubular member projecting outwardly from said housing and encircling said second opening, said tubular member being configured to mate with an underground cable shielding conduit.

8. In combination, a ground level support pad for supporting electrical apparatus, the pad having at least one access opening formed therein for the routing therethrough of electrical cables for attachment to said electrical apparatus disposed on said support pad and a cable directing device for enclosing and directing underground electrical cable between an underground shielding conduit for the cables and the above-ground electrical apparatus disposed on said preformed supporting pad having said access opening substantially enlarged in relation to the underground conduit for passage of the cables through the access opening, said directing device comprising a hollow housing defining first and second cable passage openings and a cable directing passageway extending interiorly through said housing between said first and second cable passage openings, said first cable passage opening being directed upwardly into said support pad and being substantially larger than said second cable passage opening, said first cable passage opening being configured to substantially conform to and be matable with said access opening in said supporting pad and said second cable passage opening being directed generally horizontally and configured to substantially conform to and be matable with the underground shielding conduit, including a mating member projecting outwardly from said housing and configured to mate with an underground shielding conduit, said first and second cable passage openings being oriented substantially perpendicularly to one another and said cable directing passageway being curved substantially ninety degrees (90°) between said first and second cable passage openings and being tapered narrowingly from said first cable passage opening toward said second cable passage opening, whereby said cable directing device may be positioned to project downwardly from the access opening in the supporting pad for directing a plurality of underground cables between said access opening in said supporting pad and the underground conduit.

9. A cable directing device according to claim 8 wherein said front wall portion includes a bracing wall portion disposed adjacent and below said second cable passage opening for ground abutment to brace said device against movement after installation.

10. A method for routing electrical cable from an underground conduit to an above-ground electrical apparatus comprising the steps of:

providing a hole in the ground at a location for disposition thereabove of an above-ground electrical apparatus;

providing a surface mounted support pad for the electrical apparatus having at least one opening formed therein for passage of electrical cable therethrough;

mounting said support pad above said hole;

providing a cable directing device having a hollow housing defining an upwardly directed first cable passage opening and a horizontally directed second cable passage opening, a cable directing passageway therebetween, and a flange projecting perpendicularly outwardly from said housing adjacent said first cable passage opening, said housing including a mating member for mating said housing with the underground conduit, said housing tapering from a relatively wide portion at said first cable passage opening to a relatively narrow portion at said second cable passage opening;

mounting said cable directing device on said support pad by placing said narrow portion through said access opening in said pad and lowering said cable directing device into said hole until said flange engages said support pad;

routing the electrical cable into said second cable passage opening, through said housing, and upwardly through said first cable passage opening; and mating said mating member with said underground conduit.

11. A method for routing cable from an above-ground electrical apparatus to an underground conduit comprising the steps of:

providing a hole in the ground at a location for disposition thereabove of an above-ground electrical apparatus;

providing a surface mounted support pad for the electrical apparatus having at least one opening formed therein for passage of electrical cable therethrough;

mounting said support pad above said hole;

providing a cable directing device having a hollow housing defining an upwardly directed first cable passage opening and a horizontally directed second cable passage openings, a cable directing passageway therebetween, and a flange projecting perpendicularly outwardly from said housing adjacent said first cable passage opening, said housing including a mating member for mating said housing with the underground conduit, said housing tapering from a relatively wide portion at said first cable passage opening to a relatively narrow portion at said second cable passage opening; and mounting said cable directing device on said support pad by placing said narrow portion through said access opening in said pad and lowering said cable directing device into said hole until said flange engages said support pad;

routing the electrical cable downwardly into said first cable passage opening, through said housing and outwardly through said second cable passage opening into the underground conduit; and mating said mating member with said underground conduit.

* * * * *